Oct. 3 1967    R. H. SICKING    3,345,640
MECHANICAL PENCIL FOR AUTOMATIC DATA PLOTTING EQUIPMENT
Filed March 30, 1966    2 Sheets-Sheet 1

INVENTOR.
ROBERT H. SICKING
BY
ATTORNEYS

Oct. 3 1967   R. H. SICKING   3,345,640
MECHANICAL PENCIL FOR AUTOMATIC DATA PLOTTING EQUIPMENT
Filed March 30, 1966   2 Sheets-Sheet 2
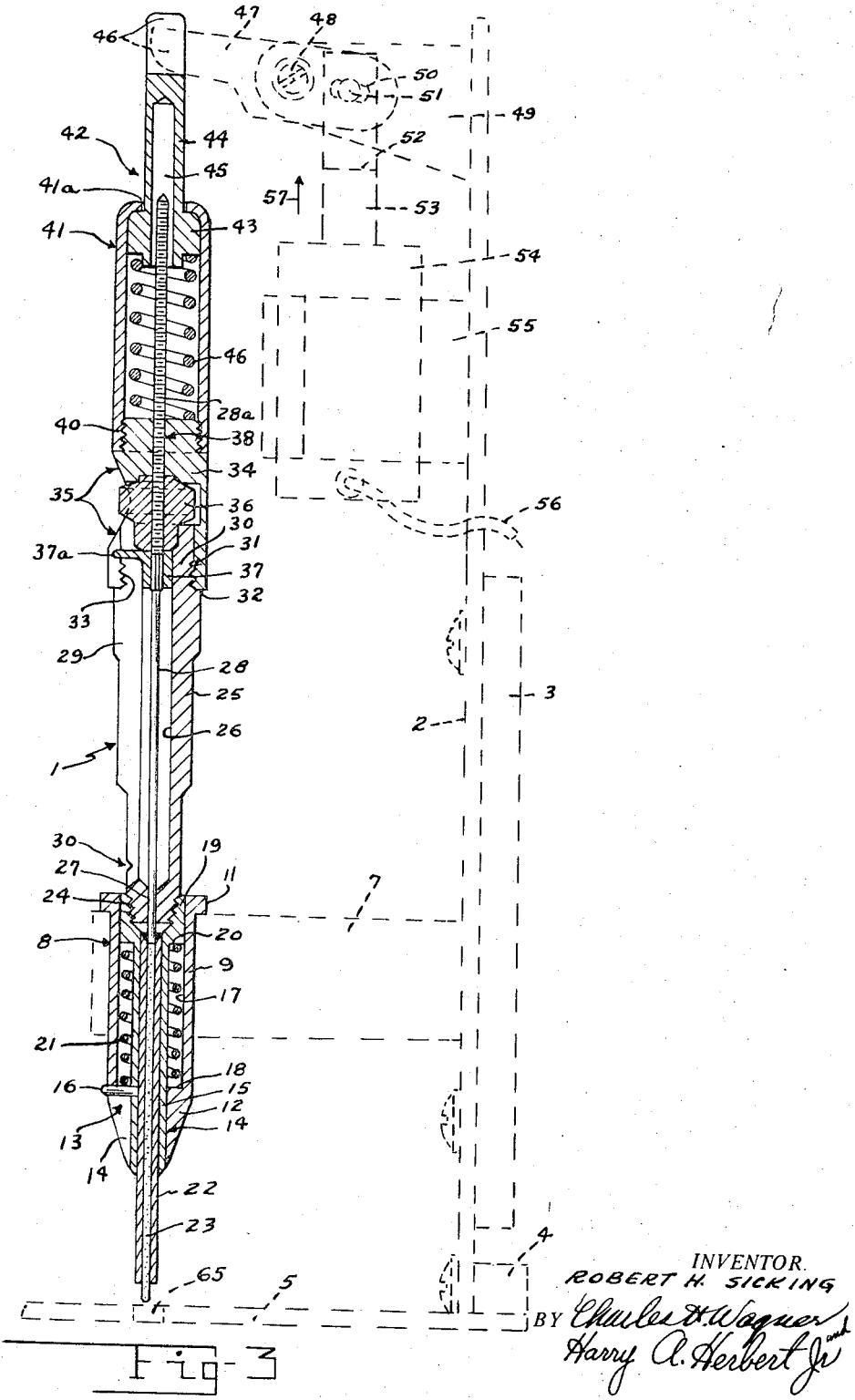

_United States Patent Office_

3,345,640
Patented Oct. 3, 1967

3,345,640
MECHANICAL PENCIL FOR AUTOMATIC DATA PLOTTING EQUIPMENT
Robert H. Sicking, 5705 Itaska St., St. Louis, Mo. 63109
Filed Mar. 30, 1966, Ser. No. 538,931
8 Claims. (Cl. 346—139)

The invention described herein may be manufactured and used by or for the United States Government for governmental purposes without the payment to me of any royalty thereon.

This invention relates to apparatus for advancing cylindrical material, such as a pencil lead through a holding chuck; and more particularly to such apparatus adapted for use on data plotters and other machines used to draw lines or make pencil marks by remote control.

The present pencil apparatus finds particular application on electronic data plotters such as manufactured by Concord Control Inc.; these devices being used extensively for producing contour maps, road maps, weather maps, engineering drawings, and a variety of charts, such as statistical charts. The usual practice, when the chart is produced on paper, is to use a pen marking device on the apparatus or machine. If the chart is to be produced on opaque coated film, a stylus is used to engrave the film.

For many uses on paper, ordinary carbon lead for marking on the paper would be preferable to ink, and has been tried, but without complete success. Prior attempts to use lead in these devices have pointed out the problem areas including the difficulty of maintaining contact with the paper as the lead wears, the difficulty of advancing the lead in the chuck and maintaining proper pressure on the lead during marking, and eliminating the breaking of the lead, etc., also including the difficulty of replacement of the leads after they have been used up.

The invention to be presently disclosed is the composite result for creating a pencil marking apparatus having an object of eliminating the aforementioned difficulties and objections, and which will permit the making of pencil charts, particularly in cases where such pencilled charts are preferable over those made with ink, or with a stylus.

Another object is the provision of a pencil marking device or structure which may be employed in automatic as well as manually manipulatable electronic data plotters.

A further object is the provision of a pencil marking device for data plotters in which means are provided for determining the amount of unexpended lead therein.

A still further object is the provision of a pencil marking device or apparatus for use on data plotters in which the marking lead may be renewed in an easy manner and without disturbing the data plotter.

Another object includes resilient means for moving the pencil lead into a resilient marking engagement with a chart to be processed to permit marking with extreme variations in the relative position of the pencil mount and the marking surface.

A further object includes a pencil apparatus for data charting devices including double spring biasing means in which one spring comprises means for yieldably advancing the lead and its guide tube toward the work and a second spring compressible thereby to compensate the lead advancing pressure of the first spring as the lead is advanced into marking contact with the work, such as a data sheet.

A further object is the provision of means for readily removing and replacing the lead holding tube in the event of damage, or the desire to change the lead colors or sizes.

A further object includes the provision of a mounting means for supporting the pencil in vertical position, including a solenoid actuator for advancing the lead into marking position, including fixed guide means for holding the lead guide tube axially slidably therein, together with resilient means yieldably supporting the guide tube structure against downward movement, together with lead advancing mechanism removably fixed to said guide tube structure including stronger spring means between the lead advancing mechanism and the solenoid to resiliently advance the lead advancing mechanism downwardly to move the lead into contact with the work and compress the first mentioned spring means to prevent excessive actuation pressure of the actuating solenoid from being applied to the lead during marking of the chart.

Further objects and advantages of the invention will become apparent from the following description and accompanying drawings in which like reference characters refer to like parts in the several figures.

In the drawings:

FIGURE 3 is a vertical sectional view through the improved pencil or lead holder device with the mounting means and actuating solenoid shown in dotted lines.

Figure 1:
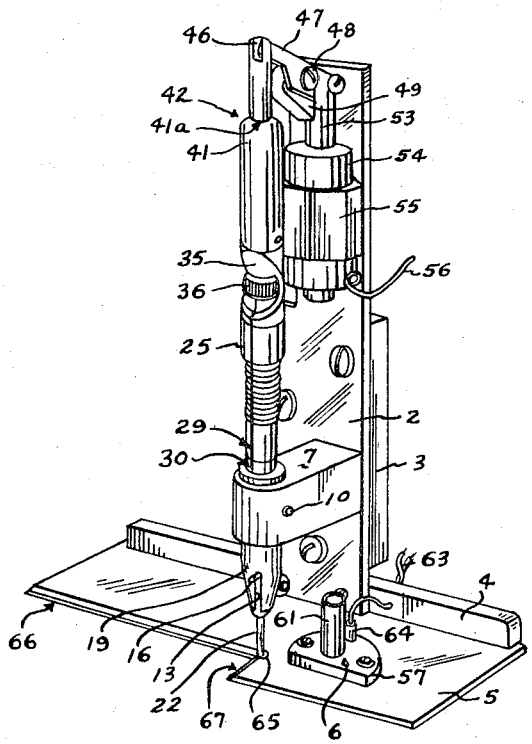
FIGURE 1 is a perspective view of the pencil embodying the invention and associated mounting and actuating hardwear, designed especially for attachment to and use thereof on a programmer, such as the Model E-75 Automatic Photo Composition Placement System, produced by Concord Control, Inc., Boston, Mass.
Figure 2:
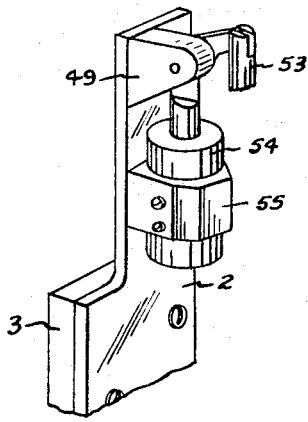
FIGURE 2 is a fragmentary perspective view showing the actuating solenoid from the opposite side as shown in FIGURE 1.

Referring more particularly to Figs. 1 and 3 the reference numeral 1 denotes the pencil device or apparatus, generally constituting the invention. The pencil apparatus includes a vertical base or supporting plate, or mounting member 2 mounted on an adapter plate 3 which is fixed to a mask support or batton 4 in turn secured to the mask plate 5, which is preferably transparent and made of plastic, for instance Plexiglas, and is more clearly seen in the perspective view in FIG. 1 and carried thereon and illuminating and magnifying lens reticle assembly indicated generally at 6, and shown in section in FIG. 4.

Referring again to FIGS. 1 and 3 the mounting plate 2 has fixed thereon a rigid pencil mount or bracket 7 having a cylindrical bore or opening 8 therethrough in which is inserted a fixed lower pencil supporting housing 9 comprising the (marking) lead holding mechanism, retained in position by any suitable means, for instance by a set screw or set screws 10. This lower housing 9 comprises an outer sleeve or housing having an outwardly flanged upper end 11 adapted to seat and rest on the top of the bracket 7 and is formed with a lower conical end 12 which is vertically slotted at 13 and is formed with a lower cylindrical guide passage or bore 14 slidably receiving a lower plunger 15. The plunger 15 has a pin 16 projecting therefrom into the slot 13 to prevent the plunger from turning in the housing. The housing 9 is counter-bored at 17 to provide a cylindrical barrel having a spring seat shoulder 18 at its lower end.

The upper end of the lower plunger 15 is formed with an enlarged guide head 19 vertically slidable in the counter-bore 17 and also forming a spring seat or shoulder 20 with the smaller cylindrical body of this plunger.

A lower coil spring 21 surrounds the plunger 15 with its upper and lower ends respectively in contact with the upper and lower shoulders or spring seats 20 and 18.

The spring 21, hereafter also referred to as the lighter compression spring normally, but yieldably urges the plunger 15 upwardly with the upward movement limited by the engagement of the pin 16 with the upper end of the slot 13, as seen in FIG. 3.

The so-called plunger 15 has a central bore therethrough in which is fixed the pencil lead holding tube 22 to receive, guide and feed the pencil or marking lead 23 therethrough so as to project beyond the lower end of the tube 22.

The upper end of the plunger 15 is counter-bored and internally threaded as indicated at 24, and threadably receives a removable barrel 25, and therefore is urged upwardly by the lower or lighter coil spring 21. This barrel 25 is formed with a cylindrical bore 26 terminating in a reduced diameter guide opening 27 for a lead advancing plunger rod 28, later referred to in detail.

The barrel 25 is also formed with a longitudinal guide slot 29 extending from its upper end to about the location of the smaller threaded portion 24. The outer surface of the barrel 25 adjacent the smaller threaded portion is notched or marked at 30 to provide a lead replenish reference mark.

The barrel 25 is formed with a threaded upper end 31 and shoulder 32 which receives the threaded lower end 33 of a thumb wheel housing 34 which is suitably recessed with a cutaway portion at 35 to receive a thumb wheel 36 for advancing and positioning the pencil lead 23 with respect to the lower end of the lead guide tube 22.

The lead advancing plunger rod 28 is preferably formed with an upwardly extending full threaded extension 28a on which is threaded the thumb wheel 36 with the periphery thereof exposed through the cutout portion 35, the thumb wheel having a downward central projection journalled in the socketed upper end of the barrel 25, the head or upper end of the housing 34 and the engagement with barrel 25 preventing vertical movement of the thumb wheel as it is rotated.

Rotative adjustment of the thumb wheel 36 in the housing 34 moves the lead advancing plunger rod 28 up or down through the barrel and in the lead guide tube 22.

In order to prevent rotation of the plunger rod 28 and screw threaded extension 28a, as the thumb wheel 36 is rotated the lower end of the threaded extension 28e has a short sleeve member 37 fixed thereon having a lateral projection or pin 37a which extends into the slot 29. The body of the sleeve 37 slidably fits the cylindrical bore 26. The plunger 28 and threaded extension 28a may be made in two pieces fixed together or made integral if desired. The threaded extension 28a passes slidably through the bore 38 in the thumb wheel housing 34 as shown, the upper end of the housing 34 being suitably threaded at 40 to receive an upper spring housing or cap 41.

An upper or actuating plunger 42 comprises a head portion 43 and a concentric smaller diameter hollow plunger rod or extension 44 having a bore 45 therein for receiving the upper portion 28a of the threaded portion of the lead advancing plunger rod 28.

A coil spring 46 which is somewhat stronger than the coil spring 21 is disposed within the cap or upper spring housing 41 between the plunger head 43 and the top of the thumb wheel housing 31 normally urging the plunger 44 and barrel 25 axially away from each other, the top of the spring housing 41, of course, being apertured at 41a to slidably receive the plunger 44 therethrough.

The upper end of the plunger 44 is notched out at 46 to receive the outer end of an actuating or depressing lever 47 which is pivoted at 48 on a lever assembly mount or bracket 49 fixed on the mounting plate 2.

The tail end of the actuating lever 47 is provided with a slot 50 for receiving a projecting pin 51 in the notched end 52 of solenoid plunger 53 extending into the actuating solenoid 54 which is carried or fixed in a solenoid mount or bracket 55 that is fixed on the main mounting plate 2 and energized when desired by the electrical conductor or other suitable circuit means 56.

The normal (unenergized) position of the solenoid 54 and parts 53, 47, 44 etc. are as shown in FIG. 3, and when the solenoid 54 is energized the plunger 53 is moved in the direction of the arrow 57. When the solenoid 54 is energized the lever 47 is rocked counterclockwise around the pivot 48 to force the upper hollow plunger 44 downwardly in the cap 41 so that the head compresses, or tends to compress the upper stronger spring 46. This spring bearing against the thumb wheel housing 38 moves the barrel 25 downwardly, thus depressing the lower plunger 15 to lower the lead guide tube 22 and compress the lower lighter plunger spring 21 to advance the marking lead or pencil 23 into marking contact with the surface or chart to be marked.

When the lower end of the lead contacts the marking surface the downward movement of the lower plunger 15 is stopped. However, the solenoid 54 continues its full stroke and the upper plunger 44 is moved downwardly in the cap 41 to compress the upper stronger spring 46 to resiliently urge the barrel 25 to move the lead into more positive, yet yielding, marking contact with the surface to be marked. This applies a positive but yielding marking pressure on the lead 23 when the solenoid 54 is actuated. This maximum pressure can be determined by the calibration of the springs 46 and 21.

The lower lighter spring 21 lifts the barrel, lower plunger, and lead when the solenoid 54 is deenergized, and may be calibrated to return the solenoid plunger 53 to its nonoperative position, if desired. The upper spring 46, in addition to applying a predetermined yieldable pressure on the lead and permitting a full solenoid stroke, prevents excessive pressure on the lead 23 and returns the head 43 of the upper plunger 44 to the top of the cap 41 (when solenoid is deenergized).

As the lead 23 wears away the thumb wheel 36 may be rotated to advance the threaded rod 28a and plunger rod 28 downwardly to advance the lead 23 out through the lead guide tube 22. The pin 37a projecting into the slot 29 prevents the plunger rod 28 from turning when the thumb wheel 36 is turned.

The barrel 25 has three step down portions and shoulders which can be used, by notating the position of the pin 37a therebetween to note the amount of lead used, such as one-third, two-thirds, and less than two-thirds. Also, when the pin reaches the notch 30, this indicates that the pencil lead needs replacing as it is practically all used up. Replacement of the lead 23 is made easy and convenient by the invention.

The pin projection 16, besides showing the amount of depression of the plunger tube 22 (amount of lead projecting from the end thereof) by its position with respect to the end of the slot 13 when solenoid is energized, also prevents rotation of the lower plunger 15 in the fixed housing 9. When the lead 23 is used up, or needs to be replaced, the thumb wheel 36 is manipulated to withdraw the plunger rod 28 as seen in FIG. 3. The barrel 25 can now be rotated to unscrew and detach the lower threaded end 24 from the head 19, slight upward movement of the barrel 25 being permitted by the upper coil spring 46 and sliding action between the cap 41 and upper hollow plunger 44.

The lead advance mechanism 1 as a whole can now be removed and a fresh lead inserted in the lead guide tube 22 through the threaded socket in the head 19 and pushed through, after which the barrel 25 can be replaced in the head 19 and screwed in tight with the free end of the actuating lever 47 disposed in the notch 46 of the upper plunger 42, as shown.

The guide tube 22 can be made to frictionally hold the lead 23 against dropping out in conventional ways. Rotation of the thumb wheel 36 will now advance the plunger rod 28 downwardly to thus advance the lead 23 to the desired distance beyond the end of the guide tube 22.

The employment of the upper and lower spring arrangements 46 and 21 permits the full throw of the solenoid 54 to be partially absorbed, permitting a variable downward throw of the basic mechanism. Since the lower spring 21 is weaker, it is compressed first to allow the lead 23 to come into contact with the plotting surface, after which the upper spring 46 then absorbs the remainder of the solenoid throw and applies the yieldable additional pressure to the pencil lead to cause it to mark and allows for a predetermined amount of lead wear between advancing adjustments of the lead by the thumb wheel 36.

Figure 4:
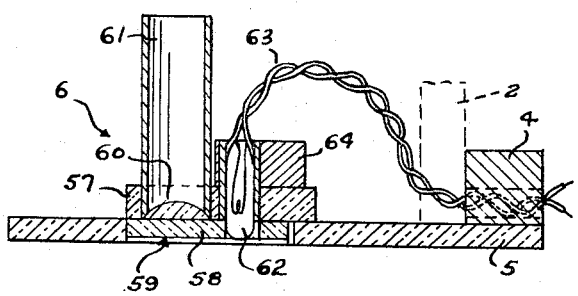
FIGURE 4 is a vertical sectional view through the reticle and illuminating means mounted on the base plate as seen in FIG. 1.

The mask 4 carries a positioning reticle assembly 6 previously referred to, and shown in FIGS. 1 and 4. It includes the plate 5 which may be transparent and is apertured to receive the assembly 6 therein.

The assembly 6 comprises a mounting plate of transparent Plexiglas or the like having a mounting flange 57 which is secured on the top surface of the supporting plate or base 5. A transparent bottom plate 58 of about the same thickness as the plate 5 is secured to the bottom of the flange 57, and inscribed on its lower surface with a cross (cross hairs) located at 59 for spotting the plate 5 on the marking surface or chart (not shown). A lens 60 is disposed directly above the cross hairs for magnifying the same. A sighting tube 61 extends upwardly from the lens 60 through the flange plate 57. Directly behind and adjacent to the sighting tube 61 (as seen in FIGS. 1 and 4) the plates 57 and 58 are apertured to receive illuminating means which may be in the form of a small electric lamp bulb 62 supplied with current through the conductors 63 to illuminate the cross hairs of the reticle and the portion of a chart therebelow, a suitable heat sink 64 being provided to dissipate the heat from the lamp 62.

The transparent base plate 5 is formed with an opening 65 through which the pencil lead 23 and tube 22 can pass and the outer edge of the plate 5 (as seen in FIG. 1) is cutaway and beveled as indicated at 66 and 67 with the cutaway portions intersecting at the central axis of the pencil lead 23, thus when the bevel edges 66 and 67 are placed on perpendicular coordinates (X and Y) the center of the lead 23 will be on the intersection.

For purposes of exemplification a particular embodiment of the invention has been shown and described to the best understanding thereof. However, it will be apparent that changes and modifications in the arrangement and construction of the parts thereof may be resorted to without departing from the true spirit and scope of the invention as defined in the following claims.

I claim:

1. A mechanical pencil for data plotting equipment comprising a lower fixed housing having a cylindrical bore therein, a marking lead holding lower plunger axially movable in said bore having a concentric marking lead holding and feeding passage therein for receiving and holding a marking lead therein, means between said housing and lower plunger for limiting upward movement of said plunger in said bore, lower spring means between said housing and said lower plunger yieldably urging said lower plunger upwardly in said housing to said upward limited position, a marking lead feeding barrel removably mounted in the upper end of said lower plunger having a marking lead advancing plunger rod concentrically positioned therein and axially movable therein for advancing engagement with a marking lead when disposed in said marking lead receiving passage in said lower plunger, manually actuated adjusting means carried by said barrel for adjusting said plunger rod downwardly in said barrel to engage and advance the marking lead in said lower plunger independent of lower plunger movement in said housing, an upper plunger movably carried by said barrel for moving said barrel downwardly to move said lower plunger downwardly in said lower fixed housing against compression of said lower spring means to advance said marking lead into contact with a marking surface including upper spring means between said upper plunger and said barrel for yieldably moving said barrel downwardly upon downward movement of said upper plunger to move said lower plunger downwardly in said housing to yieldably increase marking pressure on a marking lead when disposed in said marking lead holding and feeding passage in said lower plunger.

2. A device as set forth in claim 1 including means between said lower plunger and said lower fixed housing resisting relative rotation therebetween, in which said said barrel is removably threaded into the top of said lower plunger and removable for inserting a marking lead in said lower plunger, said barrel includes an axially movable plunger rod therein for advancing engagement with the marking lead when said barrel is removably fixed in said lower plunger, in which said plunger rod includes a threaded upward extension, and a thumb wheel nut rotatably fixed to said barrel for rotative adjustment only on said barrel having a concentric threaded opening therein receiving said threaded plunger rod extension in threaded engagement, whereby rotative adjustment of said thumb wheel nut on said barrel adjusts said plunger rod axially in said lower plunger to advance the marking lead therein independently of lower plunger movement to compensate for wear on the marking end of the marking lead.

3. A mechanical pencil for automatic data plotting equipment as set forth in claim 2 including, means between said barrel and said plunger rod to resist relative rotation therebetween, and means between said lower plunger and said lower fixed housing to resist relative rotation therebetween, whereby said thumb wheel nut is rotatable without rotation of said plunger rod, and said barrel can be rotated for removal from said lower plunger without producing rotation of said lower plunger in said fixed housing.

4. A device as set forth in claim 3 in which said upper spring means and said lower spring are both under predetermined compression and said upper spring means is stronger than said lower spring whereby depression of said upper plunger first moves said lower plunger downwardly to advance the marking lead into contact with a marking surface to substantially arrest downward movement of said lower plunger and continued depression of said upper plunger then compresses said stronger upper spring means to apply increased downward movement on said barrel and lower plunger, to apply increasing yieldable downward marking pressure on the marking lead to increase the marking pressure thereof on a marking surface when disposed under the marking lead.

5. Apparatus as set forth in claim 4 including indicating means between said barrel and said plunger rod for determining the relative axial position of said plunger rod in said barrel and in said lower plunger to therefor indicate the amount of marking lead remaining in said lower plunger.

6. Apparatus as set forth in claim 5 including a transparent supporting mask plate adapted to be placed on a marking surface having an opening therein for passing the marking lead therethrough, a mounting plate fixed on said transparent supporting mask plate in perpendicular relation thereto, a pencil mounting bracket fixed on and projecting from said mounting plate in spaced substantially parallel relation to said transparent supporting mask plate for fixedly supporting said housing in spaced parallel relation to said mounting plate, solenoid means fixed on said mounting plate adjacent said upper plunger, including an actuating lever pivotally carried on said mounting plate for depressing said upper plunger, and actuating means for rocking said lever to depress said upper plunger connected to said solenoid means to rock said lever upon energizing said solenoid means, and means for energizing said solenoid means to depress said upper plunger.

7. Apparatus as set forth in claim 6 in which said transparent supporting mask plate is formed with reticle assembly receiving opening therethrough disposed in predetermined spaced relation to the axis of the marking lead passing opening and includes a reticle assembly fixed in said reticle receiving opening comprising a transparent plate having cross hairs thereon for spotting said marking lead axis on a marking surface, a magnifying lens disposed above said cross hairs, a sighting tube extending upward from the periphery of said lens, and illuminating means carried by said assembly adjacent said reticle cross hairs for illuminating said cross hairs and a portion of a marking surface when disposed below said transparent supporting mask plate and within the area covered by the said cross hairs.

8. A mechanical pencil for automatic data plotting equipment comprising, a lower housing adapted to be supported above a plotting surface in fixed relation having a cylindrical bore therein terminating at its lower end in a smaller concentric lower plunger vertical guide passage having a longitudinal guide slot extending radially outward therefrom, a cylindrical lower plunger slidable in said vertical guide passage having an enlarged concentric head at its upper end slidably fitting said cylindrical bore, a marking lead guide tube concentrically fixed in said lower plunger and projecting below the lower end thereof for receiving and slidably holding a marking lead therein, a pin projecting outwardly from the side of said lower plunger through said longitudinal guide slot in predetermined spaced relation below said head to impinge the upper end of said slot to limit upward movement of said lower plunger in said housing and prevent relative rotation thereof in said housing, a compression spring in said housing having a lower end engaging said pin and an upper end engaging said head for resiliently urging said lower plunger upwardly in said housing, said head having a threaded concentric recess in the top thereof opening downwardly into said marking lead guide tube, a removable marking lead feeding barrel having a threaded lower end removably threadable in said concentric recess in said lower plunger and formed with a concentric plunger rod guide passage in the lower threaded end thereof disposed for alignment with said marking lead guide tube, said barrel having an enlarged concentric cylindrical guide bore therein extending upwardly from said plunger rod guide passage having a longitudinal slot extending outwardly therefrom, a marking lead advancing plunger rod concentrically disposed in said passage and bore for advancing engagement with a marking lead disposed in said lead guide tube, a plunger rod sleeve fixed on said plunger rod in predetermined upwardly spaced relation to the lower end of said plunger rod and slidably fitting said enlarged bore and having a lateral projection therefrom extending through the said longitudinal slot in said barrel to resist relative rotation between said plunger rod and said barrel and movable along the last mentioned slot to indicate the longitudinal position of the lower end of said plunger rod in said guide tube, including cooperating indicating means on said barrel for registration with said lateral projecton, said plunger rod including an elongated threaded extension projecting upwardly from said lateral projection, a plunger rod advancing thumb nut journalled for rotation in the upper end of said barrel threadably receiving said threaded extension therethrough, an elongated barrel-like cap extending upwardly from said barrel and fixed thereto concentrically receiving said threaded extension therethrough and formed with a concentric upper plunger guide opening in the top thereof, a hollow upper plunger member slidably mounted in said cap having an extension extending upwardly through last mentioned opening, said upper plunger having an enlarged head at its lower end slidably disposed within said cap, and upper compression spring means within said cap having a greater predetermined compressive value than the lower compression spring and having an upper end engaging the head and its lower end impinging the upper end of the barrel structure, and means adjacent the upper end of the upper plunger for depressing said upper plunger to move the barrel and lower plunger downwardly, whereby initial downward pressure on upper plunger moves said barrel downwardly, to move said plunger, barrel, lower plunger and lead guide tube downwardly to compress the lower lighter spring and bring a marking lead in said guide tube into contact with a marking surface, and further depression of said upper plunger compresses the upper spring member to yieldably apply increased downward pressure on said lower plunger to yieldably increase downward marking pressure on the marking lead.

References Cited

UNITED STATES PATENTS 3,293,658  12/1966  Sicking _____ 346—139

RICHARD B. WILKINSON, *Primary Examiner.*

JOSEPH W. HARTARY, *Assistant Examiner.*